J. H. BULLARD.
Assignor to the AERATED FUEL COMPANY.
APPARATUS FOR BURNING HYDROCARBONS.
No. 11,236. Reissued Apr. 26, 1892.
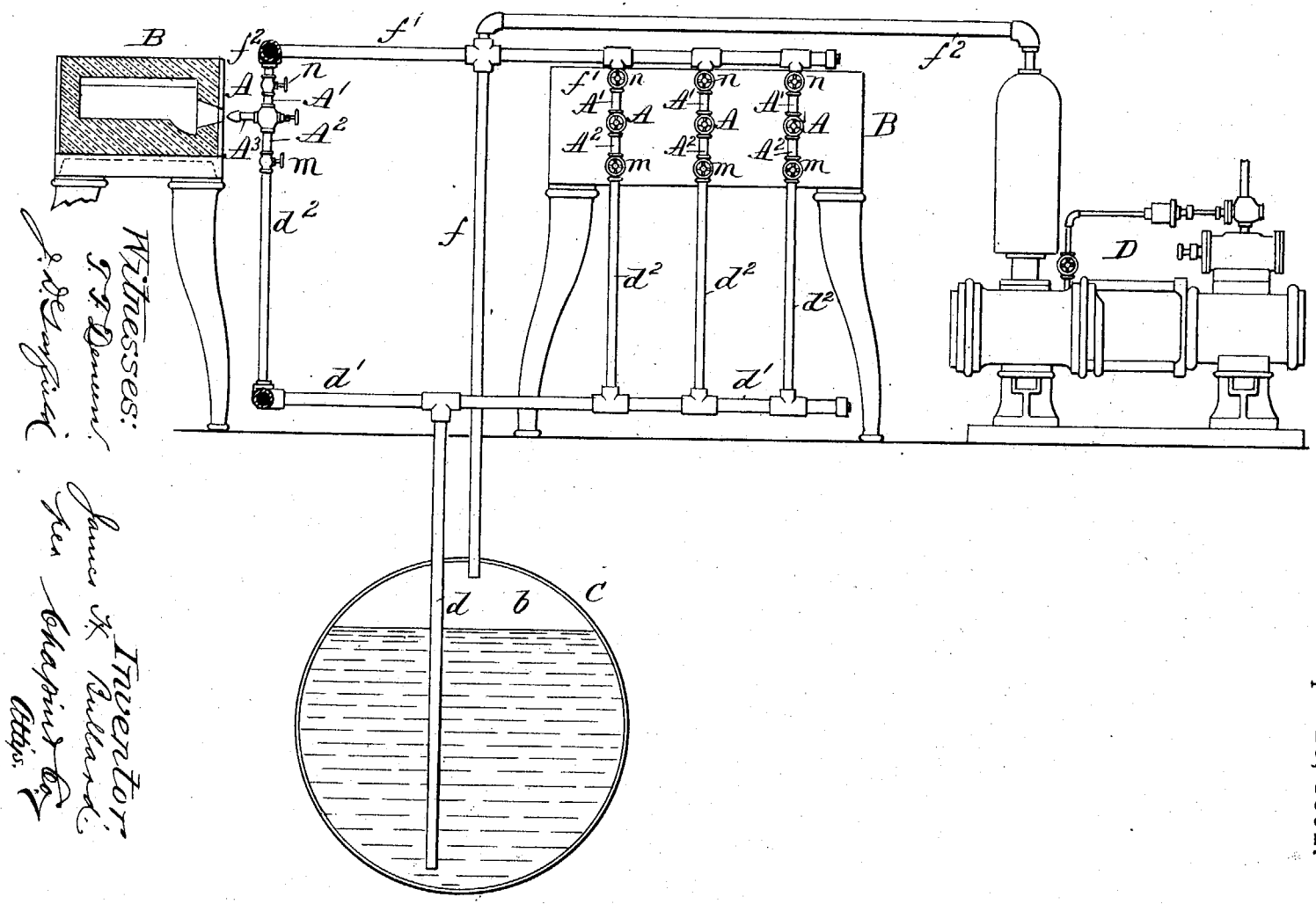
Witnesses:
T. F. Denum.
J. D. Garfield
Inventor:
James H. Bullard.
per Chapin & Co.
Attys.
THE NORRIS PETERS CO., PHOTO-LITHO., WASHINGTON, D. C.

UNITED STATES PATENT OFFICE.

JAMES H. BULLARD, OF SPRINGFIELD, MASSACHUSETTS, ASSIGNOR TO THE AERATED FUEL COMPANY, OF SAME PLACE.

APPARATUS FOR BURNING HYDROCARBON.

SPECIFICATION forming part of Reissued Letters Patent No. 11,236, dated April 26, 1892.

Original No. 463,853, dated November 24, 1891. Application for reissue filed March 19, 1892. Serial No. 425,863.

*To all whom it may concern:*

Be it known that I, JAMES H. BULLARD, a citizen of the United States, residing at Springfield, in the county of Hampden and State of Massachusetts, have invented new and useful Improvements in Apparatus for Burning Hydrocarbon, of which the following is a specification.

This invention has for its object to provide a new and improved apparatus for burning liquid hydrocarbon in conjunction with air under pressure, whereby a gang of burners are susceptible of being employed to heat a series of furnaces to different degrees of temperature as occasion may demand and the burners with their oil-supplying pipes will be effectually drained when the action of the apparatus ceases for the purpose of rendering the system safe, reliable, effective, and economical, while fulfilling the conditions of safety required by insurance companies on property where oil-burning systems are used.

To accomplish this object my invention involves the features of construction and the novel combination or arrangement of devices hereinafter described and claimed, reference being made to the accompanying drawing, in which the figure is a sectional elevation of an apparatus constructed in accordance with my invention.

In order to enable those skilled in the art to make and use my invention, I will now describe the same in detail, referring to the drawing, wherein—

The letters A indicate a gang of hydrocarbon-injector burners adapted to heat a corresponding number of furnaces B, so that each furnace is supplied with its individual hydrocarbon-burner, (one or more.) The burners each have an air-inlet limb A′, a lower vertical oil-inlet limb $A^2$, and a lateral burner-nozzle $A^3$, as is well known in this class of burners, and in such manner that oil and air are brought through the burner-body and discharged together at the burner-nozzle for directing a flame into a furnace. Each air-inlet limb A′ is provided with a cock or valve *n* for controlling the flow of air into the burner-body, and the lower vertical oil-inlet limb $A^2$ is provided with a cock or valve *m* for controlling the flow of oil into the burner-body. The oil storage or service tank C is located at a point considerably below the gang of hydrocarbon-injector burners, and ordinarily it is placed under ground. The oil is supplied to this tank to such level as to create an air-chamber *b* in the top portion of the tank. A vertical oil-delivery pipe *d* extends from the storage or service tank from a point in proximity to the bottom thereof, and this pipe connects at its upper end with a horizontal oil-distributing pipe *d′*, which is furnished with a gang of vertical oil-conducting and burner-draining pipes $d^2$, which connect, respectively, with the lower vertical limbs $A^2$ of the burners in such manner that when oil is forced to ascend the vertical oil-delivery pipe *d* it is delivered into the horizontal oil-distributing pipe *d′* and distributed to the gang of oil-conducting and burner-draining pipes $d^2$ for supplying the gang of hydrocarbon-burners with the requisite quantity of oil.

A horizontal air-distributing pipe *f′*, located above the burners, is provided with a series of branches which connect, respectively, with the air-inlet limbs A′ of the burners for supplying the requisite quantity of air thereto. An air-delivery pipe *f* leads from the horizontal air-distributing pipe *f′* and opens at its lower extremity into the air-chamber *b* of the oil storage or service tank C, and an air-pipe $f^2$ extends from the air-chamber of an air compressor or pump D of suitable construction to compress air and force it through the system of pipes into the burners and into the air-chamber of the oil storage or service tank. By this means the oil contained in the tank is forced to ascend the delivery-pipe *d* into the horizontal oil-distributing pipe *d′*, from whence it rises vertically through the oil-conducting and burner-draining pipes $d^2$ to the burners A. At the same time the air conducted by the pipe $f^2$ is delivered to the horizontal air-distributing pipe *f′* and is distributed to the several burners, so that the admixed air and oil will issue from the burner-nozzles $A^3$ for the purpose of heating the furnaces B.

The hydrocarbon-injector burners are each provided with its individual cock or valve for controlling the discharge of the air and oil therefrom, and the cocks or valves *m n* enable the flow of oil and air to the burners to be controlled at the will of the attendant.

The gang of burners constructed and arranged as described is important in that it enables the furnaces to be heated to different degrees of temperature as occasion may demand. For example, the several furnaces can be heated by the one system to different degrees of temperature, according to the work to be performed, so that the respective workmen can control the heat of their furnaces to meet the conditions required.

The special arrangement described and shown provides a force-feed system for the oil, so that the objection to the gravity-feed system is entirely avoided, while the vertical arrangement of the oil-conducting and burner-draining pipes $d^2$ and oil-delivery pipe *d* effectually and thoroughly drains the burners and their supply-pipes for the purpose of avoiding leakage of oil from the burners when the apparatus is not in operation, and also to carry back all surplus oil to the storage or service tank, and thereby entirely avoid the presence of any considerable quantity of oil in the pipe system when the apparatus is inactive. These features of arrangement are important in that they meet all the conditions for safety required by insurance companies.

The arrangement of the parts comprising the plant is such as to materially simplify its construction and operation and render the same economical, while providing for safety, reliability, and effectiveness.

By the action of the air compressor or pump the air in the air-chamber above the oil in the storage or service tank becomes compressed to the degree required for forcing the oil into and through the oil-pipes to the burners, air in proportionate quantities being also supplied through the air-supply pipes to the burners for the proper working of the apparatus. After the air-compressor ceases to operate there may be a reserve air-pressure sufficient to force oil to the burners; but the cocks or valves *m* can be promptly closed for arresting the flow of oil, and the cocks or valves *n* may also be closed for arresting the flow of air. The arrangement is such that any one of the burners in the gang can be cut out by simply closing the cocks *m n* belonging to such burner, thereby rendering this burner inoperative without affecting the action of the remaining burners in the gang. This is a desirable feature of the invention and materially contributes to its merit and utility.

An oil-burning system has heretofore been proposed wherein a burner is connected by pipes with an oil-tank and with the air-chamber of an air-compressor, which also communicates with the oil-tank in such manner as to force the oil to the burner and at the same time supply the requisite quantity of air thereto. Such, therefore, I do not broadly claim as my invention.

Having thus described my invention, what I claim is—

1. The combination, with an oil-service tank and an air-compressor, of a gang of hydrocarbon-injector burners elevated above the oil-service tank and each comprising an air-inlet, a downwardly-extended oil-inlet limb, and a burner-nozzle extended laterally relative to the oil-inlet limb, an oil-delivery pipe rising from the bottom portion of the service-tank, an oil-distributing pipe connected with the oil-delivery pipe and having a gang of upwardly-extended oil-conducting and burner-draining pipes connected, respectively, with the downwardly-extended limbs of the burners, an air-distributing pipe having a series of branches connected, respectively, with the air-inlets of the burners, an air-pipe leading from the air-compressor to the air-distributing pipe, and a pipe connection between the top portion of the service-tank and the air-distributing pipe, the whole organized and arranged for conjoint action substantially as described.

2. The combination, with an oil-service tank and an air-compressor, of a gang of hydrocarbon-injector burners elevated above the oil-service tank and each comprising an air-inlet limb having a cock or valve, a lower vertical oil-inlet limb having a cock or valve, and a lateral burner-nozzle, the vertical oil-delivery pipe rising from the bottom of the service-tank, a horizontally-arranged oil-distributing pipe connected with the upper end of the oil-delivery pipe and having along its length a gang of vertical oil-conducting and burner-draining pipes connected, respectively, with the lower vertical oil-inlet limbs of the burners, a horizontal air-distributing pipe elevated above the oil-distributing pipe and having along its length a series of branches connected, respectively, with the air-inlet limbs of the burners, an air-pipe leading from the air-compressor to the air-distributing pipe, and a pipe connection between the top portion of the service-tank and the air-distributing pipe, the whole organized and arranged for conjoint action substantially as described.

3. The combination, with an oil-service tank and an air-compressor, of a gang of hydrocarbon-injector burners elevated above the oil-service tank and each comprising an air-inlet limb having a cock or valve, a lower vertical oil-inlet limb having a cock or valve, and a lateral burner-nozzle, the vertical oil-delivery pipe rising from the bottom of the service-tank, a gang of vertical oil-conducting and burner-draining pipes communicating with the oil-delivery pipe and connected, respectively, with the lower vertical oil-inlet limbs of the burners, an air-distributing pipe having a series of branches connected, respectively, with the air-inlet limbs of the burners, an air-pipe leading from the air-compressor to the air-distributing pipe, and a pipe connection for conducting compressed air into the top portion of the service-tank, substantially as and for the purposes described.

In testimony that I claim the foregoing as my invention I have hereunto set my hand in the presence of two subscribing witnesses.

JAMES H. BULLARD.

Witnesses:
H. A. CHAPIN,
WM. S. BELLOWS.